United States Patent [19]
Burgkhardt et al.

[11] 4,333,013
[45] Jun. 1, 1982

[54] EVALUATION INSTRUMENT FOR PHOSPHATE GLASS DOSIMETER

[75] Inventors: Bertram Burgkhardt; Winfried König, both of Karlsruhe; Ernst Piesch, Eggenstein-Leopoldshafen; Hans G. Röber, Karlsruhe, all of Fed. Rep. of Germany

[73] Assignee: Kernforschungszentrum Karlsruhe Gesellschaft mit beschränkter Haftung, Karlsruhe, Fed. Rep. of Germany

[21] Appl. No.: 155,653

[22] Filed: Jun. 2, 1980

[30] Foreign Application Priority Data

Jun. 2, 1979 [DE] Fed. Rep. of Germany ....... 2922644

[51] Int. Cl.³ ............................................. G01N 21/64
[52] U.S. Cl. ................................. 250/461 R; 250/484
[58] Field of Search ............................ 250/484, 461 R

[56] References Cited

U.S. PATENT DOCUMENTS

| | | | |
|---|---|---|---|
| 3,264,476 | 8/1966 | Yokota et al. | 250/484 |
| 3,283,152 | 11/1966 | Yokota et al. | 250/484 X |
| 3,648,049 | 3/1972 | Yokota et al. | 250/461 R X |
| 3,975,637 | 8/1976 | Ikedo et al. | 250/484 X |
| 4,238,449 | 12/1980 | Deindoerfer | 250/461 R X |

FOREIGN PATENT DOCUMENTS 1589865  6/1970  Fed. Rep. of Germany .

Primary Examiner—Davis L. Willis
Attorney, Agent, or Firm—Spencer & Kaye

[57] ABSTRACT

A device for evaluating the exposure of a phosphate glass dosimeter to ionizing radiation by effecting differential scanning of the dosimeter glass with light radiation, including a member for holding the glass stationary, a device for supplying a single beam of light for effecting the evaluation; and a scanning system composed of an element defining a pivotal, elongated slit, two rotatable mirrors and two stationary mirrors arranged in the path of the single beam and operable for causing the beam to scan the glass selectively along any one of three coordinates.

10 Claims, 7 Drawing Figures

EVALUATION INSTRUMENT FOR PHOSPHATE GLASS DOSIMETER

BACKGROUND OF THE INVENTION

The present invention relates to evaluation instruments for phosphate glass dosimeters which differentially scan the glass with light radiation.

In radiophotoluminescence (RPL) radiation measuring glass dosimeters the penetration depth of ionizing radiation into the glass depends on the radiation energy (quality of the radiation).

For detecting and measuring ionizing radiation, it is known to use special phosphate glasses which form stable luminescence, or fluorescence, centers when exposed to such radiation and, after exposure, to scan the glass with ultraviolet radiation to cause those centers to produce fluorescent light whose intensity can be measured and is indicative of the ionizing radiation energy and dose. Moreover, the distribution of such luminescence centers throughout a piece of phosphate glass can vary greatly and depends on the ionizing radiation energy and direction of incidence. Thus, a comparison of the curve representing the relative measured fluorescence intensity as a function of depth in the glass in the direction of incidence of the ionizing radiation with corresponding calibration curves can be used to determine the radiation dose absorbed by human organs at a certain depth of tissue. Moreover, since the distribution of the luminescence centers in the glass clearly identifies the type of ionizing radiation, it is possible, even in the case of nonhomogeneous radiation, to distinguish between the different energy level components, such as low energy, medium, hard and high energy components, in that the curve of the emission from the luminescence centers in the vicinity of the outer glass surface at the location of incidence is determined considerably by the low energy radiation, while the curve derived from regions at a greater depth in the glass is determined to a greater extent by the high energy radiation.

As already described in German Pat. No. 1,589,856, differential scanning of the glass during evaluation can be employed to obtain information about the energy level, dose and direction of incidence of the radiation. The evaluation device for differentially scanning blocks of such glass employs a stationary slit which forms a narrow beam of light of a width of about 0.3 mm from the light produced by an ultraviolet lamp and the dosimeter glass is moved past this gap. In order to make measurements along different axes, the glass would have to be rotated manually and also inserted manually.

SUMMARY OF THE INVENTION

It is therefore an object of the present invention to evaluate such glass while it is stationary along three axes during evaluation and is not moved, thus avoiding errors from mechanical positioning and facilitating automatic measurements.

This and other objects are achieved, according to the invention, in a device for evaluating the exposure of a phosphate glass dosimeter to ionizing radiation by effecting differential scanning of the dosimeter glass with light radiation, by the provision of means for holding the glass stationary, means supplying a single beam of light for effecting the evaluation, and scanning means composed of an element defining a pivotal, elongated slit, two rotatable mirrors and two stationary mirrors arranged in the path of the single beam and operable for causing the beam to scan the glass selectively along any one of three coordinates.

DESCRIPTION OF THE PREFERRED EMBODIMENTS

Figure 1:
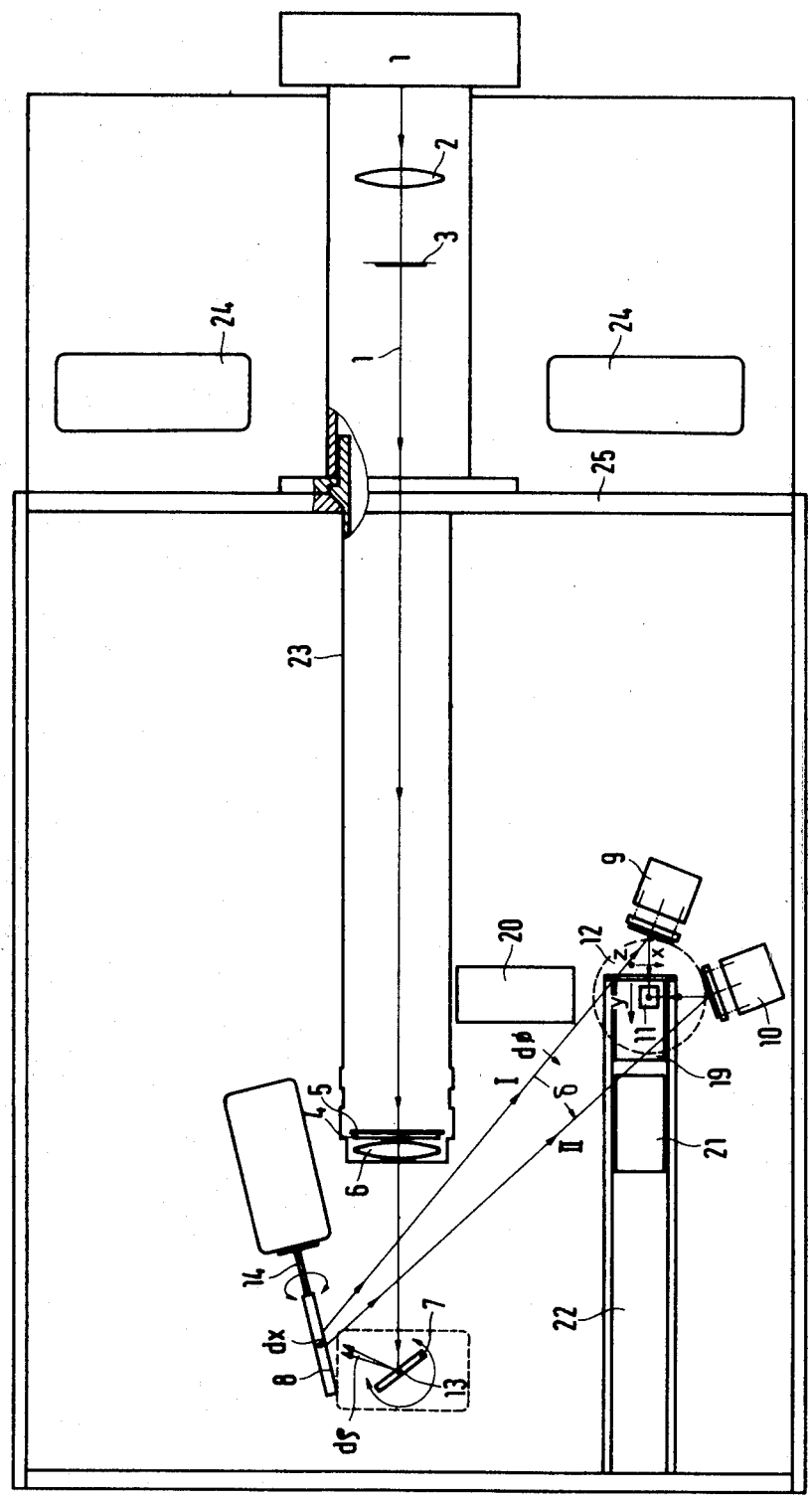
FIG. 1 is a schematic plan view of apparatus according to a preferred embodiment of the invention.

In the apparatus of FIG. 1, part of the light from a mercury high pressure lamp 1 passes through a condensor lens 2 and a pivotal slit 3 to form a narrow illumination beam 1 with a cross section measuring about $6 \times 0.2$ mm$^2$. Slit 3 is pivotal about the axis of beam 1 by the action of pulling magnets 24 to orient the slit with its long (6 mm) axis either vertical or horizontal. The brightness of the UV lamp is measured by a sensor (not shown in detail) and regulated to maintain a constant intensity value in a conventional manner. A UV filter 4 limits the spectrum to the 365 nm line required for RPL excitation.

The beam 1 is directed at a piece of dosimeter glass 11 to be evaluated by two rotary mirrors 7 and 8 and a respective one of the two stationary mirrors 9 and 10, and the image of slit 3 is reproduced to a scale of 1:1 on glass 11 by an objective lens 6. A fixed aperture 5 improves the sharpness of the reproduction. The filter 4, the aperture 5, the lenses 2 and 6, and the pivotal slit 3 are arranged in a tubular mount 23 fastened to a wall 25 of the housing of the evaluating device. Mirrors 7 and 8 are rotated about respective axes 13 and 14 by associated drive motors.

In order to scan the RPL profile in the dosimeter glass 11, which is disposed in a mount 18 in a dosimeter inlet 22, in the x direction, the pivotal slit 3 is rotated into the position shown in FIG. 1, where its long dimension is vertical, or parallel to the z dimension of glass piece 11. Rotary mirror 8 is held in the vertical orientation shown in FIG. 1 by application of a constant current to its positioning motor, and rotary mirror 7 is oriented to direct beam 1 generally along path I so that the UV beam is reflected from mirror 9 onto glass piece 11. For the first measurement, mirror 7 can be positioned to locate the beam along one edge of the face of piece 11 which extends in the x direction.

Figure 2:
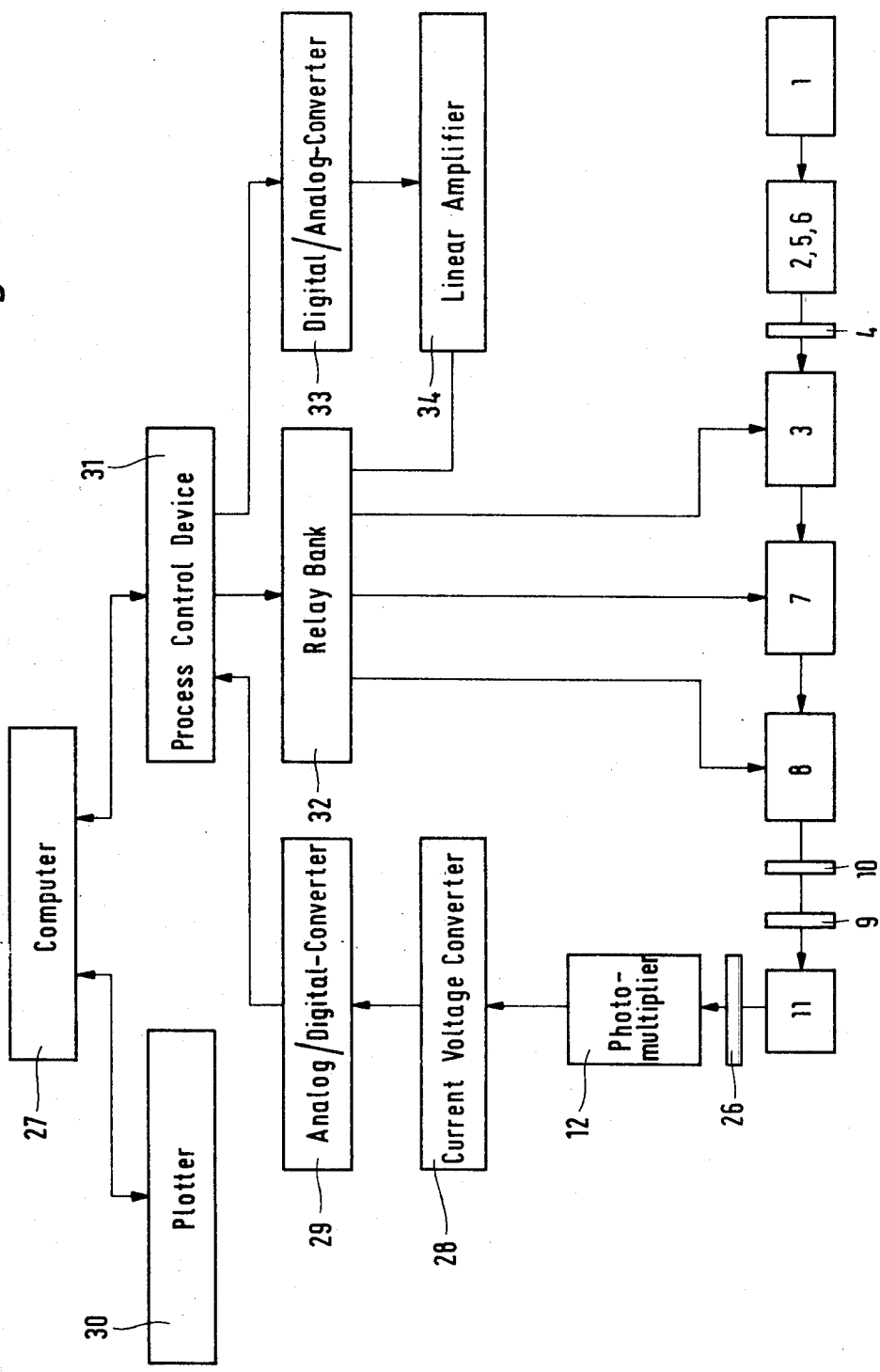
FIG. 2 is a block circuit diagram of a preferred embodiment of circuitry for apparatus according to the invention.

After reflection at the stationary mirror 9, the UV beam I impinges on the dosimeter glass 11 and excites a partial volume therein into fluorescence. The dimensions of that partial volume are approximately $8 \times 6 \times 0.2$ mm$^3$. The RPL intensity is measured perpendicularly to the exciting light beam by means of a stationary, vertically oriented photomultiplier 12. As shown in FIG. 2, stray UV light can be substantially attenuated by an orange filter 26.

After completion of a measurement, the rotary mirror 7 is rotated by a small angle $d\tau$ about its axis 13 by subjecting the current to its positioning motor to a variation di so that the axis of UV beam I is rotated through an incremental angle dφ, corresponding to a displacement dx along mirror 8, to bring UV beam I to an adjacent location on the face of piece 11 and the RPL intensity is measured by means of detector 12. By further stepwise rotations of mirror 7 and measurements via detector 12, the RPL profile in the dosimeter glass 11 can be plotted as dots appearing in timely succession in the x direction.

The scanning in the y direction is effected in the same manner, again with a vertical orientation of the long dimension of slit 3. First, the rotary mirror 7 is rotated about its axis 13 by an angle δ so that the UV beam 1 extends generally along path II and impinges on mirror 10 instead of on mirror 9, and then on the face of dosimeter glass 11, which extends in the y direction. Scanning in the y direction then takes place in the manner described above with reference to the x direction.

For scanning in the z direction, the horizontal rotary mirror 7 is held in the position corresponding to path I, the slit 3 is pivoted to orient its long dimension horizontally by means of pulling magnets 24 and the now horizontally oriented UV beam I is moved over the glass in the z direction by rotating mirror 8.

The UV radiation passing through the dosimeter glass 11 is substantially absorbed by the light traps 20 and 21 of conventional design.

A shield (not shown in detail) prevents interfering magnetic influences from reaching the photomultiplier 12.

Referring to FIG. 2, the output signal from photomultiplier 12 is processed by a current/voltage converter 28 composed of preamplifiers, regulating amplifiers, and an A/D converter 29, is displayed digitally and fed via a process control device 31 into a, for example, table-model computer 27. The computer generates output signals which are recorded in a plotter 30. Computer 27 further generates, via process control device 31 and a relay bank 32, signals for controlling the setting of components 3, 7 and 8. The circuit diagram here shows the schematics of the evaluation device and its incorporation in the circuit. The following exemplary modules were employed in an operative embodiment: table-model computer 27, HP 9825; plotter 30, HP 9872; process control device 31 with analog/digital converter 29, relay bank 32 digital/analog converter 33, HP multi-programmer 6940 B and linear amplifier 34; photomultiplier 12, Valvo XP 1017; ultraviolet lamp 1, OSRAM HBO 100 W2, rotary mirrors 7 and 8, General Scanning G 300; stationary mirrors 9 and 10, Spindler and Hoyer, UV coating; optical filter 4, Schott UB 1; and optical filter 26, Schott OG 530. The digital/analog converter 33 and the linear amplifier 34 are only used for the calibration of the glass depth and the linear indication of the glass position in mm by using the adjusting cube 17 (see FIG. 5).

Figure 3:
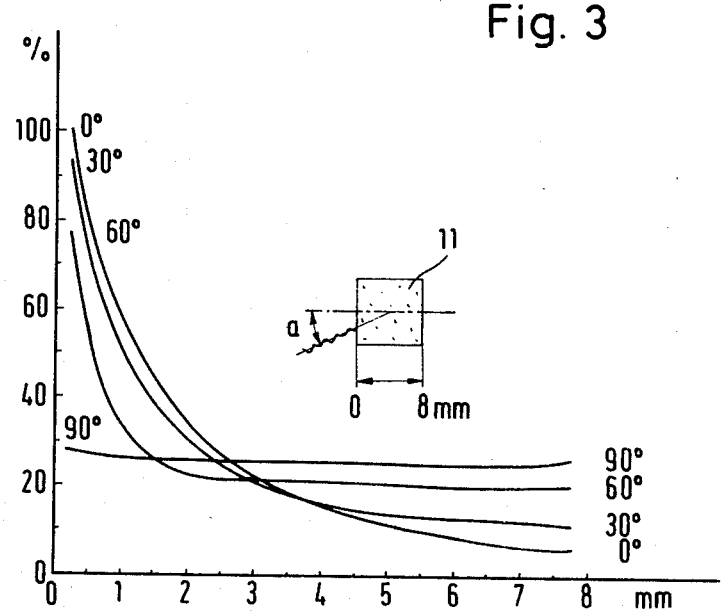
FIGS. 3 and 4 are measured value curves illustrating the operation of the device of FIGS. 1 and 2.
Figure 4:
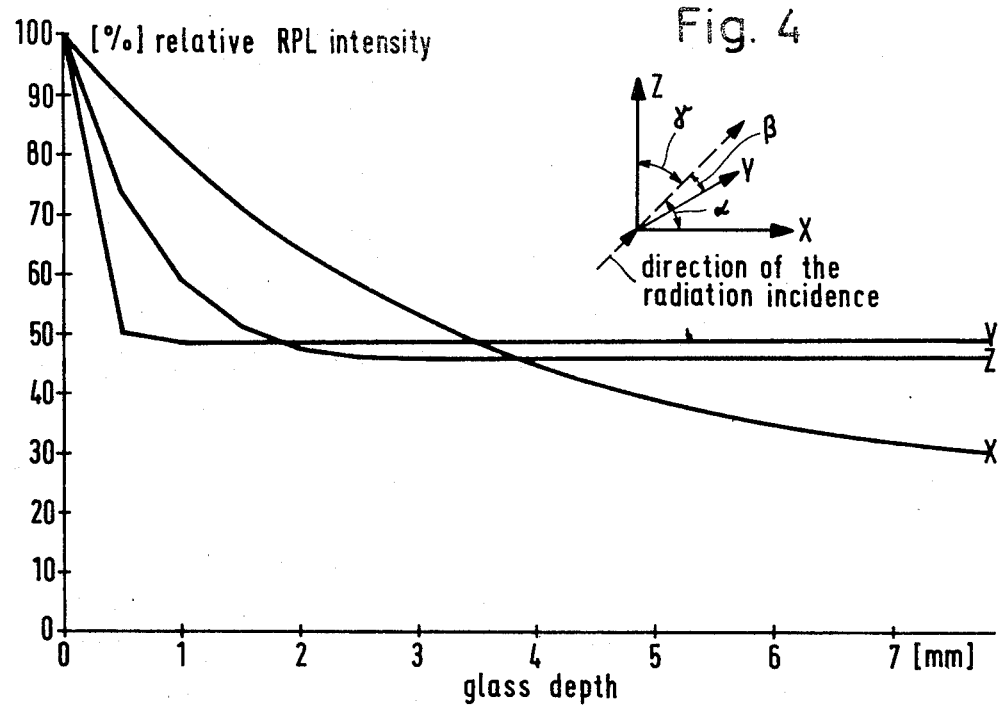

The result of a measuring cycle is stored in computer 27 in that three RPL profiles are recorded along three mutually perpendicular coordinate axes with, for example, 40 measuring points per axis. From these profiles, impingement angles can be determined with respect to the axes. Thus, FIG. 3 shows the response of photomultiplier 12, as a percentage of its maximum reading, as a function of depth from the glass surface, in mm, for a glass tube 11 which has been subjected to 19 keV photon radiation having different impingement angles a. FIG. 4 shows the corresponding dose depth profiles along three axes x, y and z.

As shown in FIG. 3, an angle of incidence of 0° results in an almost exponential drop in the RPL intensity over the entire depth of the glass. With increasing angle there occurs a progressively steeper drop. It is followed by a zone in which the intensity remains constant. The glass depth at which this transition to a constant RPL intensity takes place is specific for the associated angle of incidence and independent of the energy of the radiation to be detected.

If the three RPL profiles are superposed (sum RPL-profile), a curve results whose drop is characteristic for the radiation quality, or radiation energy, and independent of the angle of incidence of the radiation. By comparing curves and glasses which have been irradiated with photon radiation of known energy, the radiation quality can be determined. The dependence of the dose display on energy, which in the glass DOS 8 can be at most a factor of 3.6, can be corrected with the aid of the dose depth distribution, as shown in FIG. 3.

The method can be optimized to reduce the directional dependence. With reference to one region of the glass, the areas under the RPL curves, as shown in FIG. 3, for various values of incidence angle a are approximately equal to and thus a measure for the energy dose absorbed in the glass even with different directions of incidence of the radiation. An example of the depth dose profiles along the x,y,z-axes for an irradiation with 25 keV photons and a direction of radiation incidence (as shown in FIG. 4 above the curves with $\alpha=20°$, $\beta=85°$ and $\gamma=71°$) is presented in FIG. 4.

The operation of all modules required to perform the measurements of the three RPL profiles in a dosimeter glass are controlled by the computer 27 of the circuit shown in FIG. 2. Included in this control is the position of the pivotal slit 3, the supply of the motors operating the rotary mirrors 7 and 8 with current so as to direct the UV beam 1 into the desired glass depth in the desired coordinate axis, x, y or z, the selection of the optimum gain in the regulating amplifier as well as the measurement of the RPL intensity.

Moreover, with the use of stored data relating to reference glasses, the computer 27 can automatically determine and print out the quality of the radiation, the direction of incidence and the measured dose value and can record them graphically on a 4-color plotter. Other computer programs serve to automatically adjust the UV beam 1 and to compensate the indication of the measured glass depth.

Figure 5:
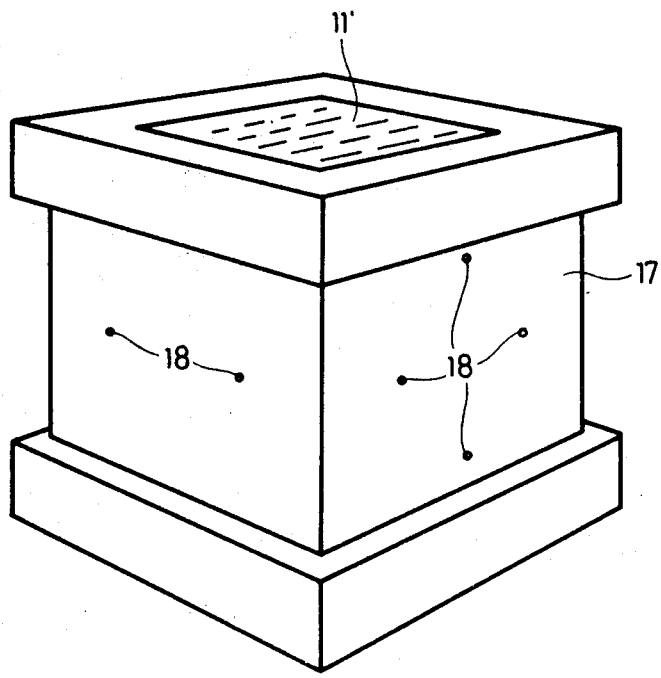
FIG. 5 is a perspective view of a calibrating device which can be used in the device of FIGS. 1 and 2.

Referring to FIG. 5, to adjust the position of the UV beam 1 relative to the dosimeter glass 11, a glass mount holding a brass adjusting cube 17, is secured in the measuring position instead of the normal dosimeter, i.e. instead of a glass mount holding a dosimeter glass, before the start of a series of measurements.

This adjusting cube 17 includes a small block of phosphate glass 11' which has been irradiated with a large dose of hard photon radiation. Four faces of the glass 11' are covered by the brass body 17 and that body is perforated by six bores 18 each having a diameter of 0.2 mm, which in a dosimeter glass correspond to a glass depth of 2 and 6 mm for the corresponding coordinate axis x, y or z.

If the UV beam 1 as shown in FIG. 1 scans the adjusting cube 17 and impinges through a hole 18 on the irradiated glass 11' in the interior, the multiplier 12 measures strong RPL's. Since there exists, to a good approximation, a linear relation between the angles of rotation of the scanning mirrors 7 or 8 and the glass depth, the two angles required to reach the two bores 18 of each axis are used to calculate the parameters of this relationship.

Figure 6:
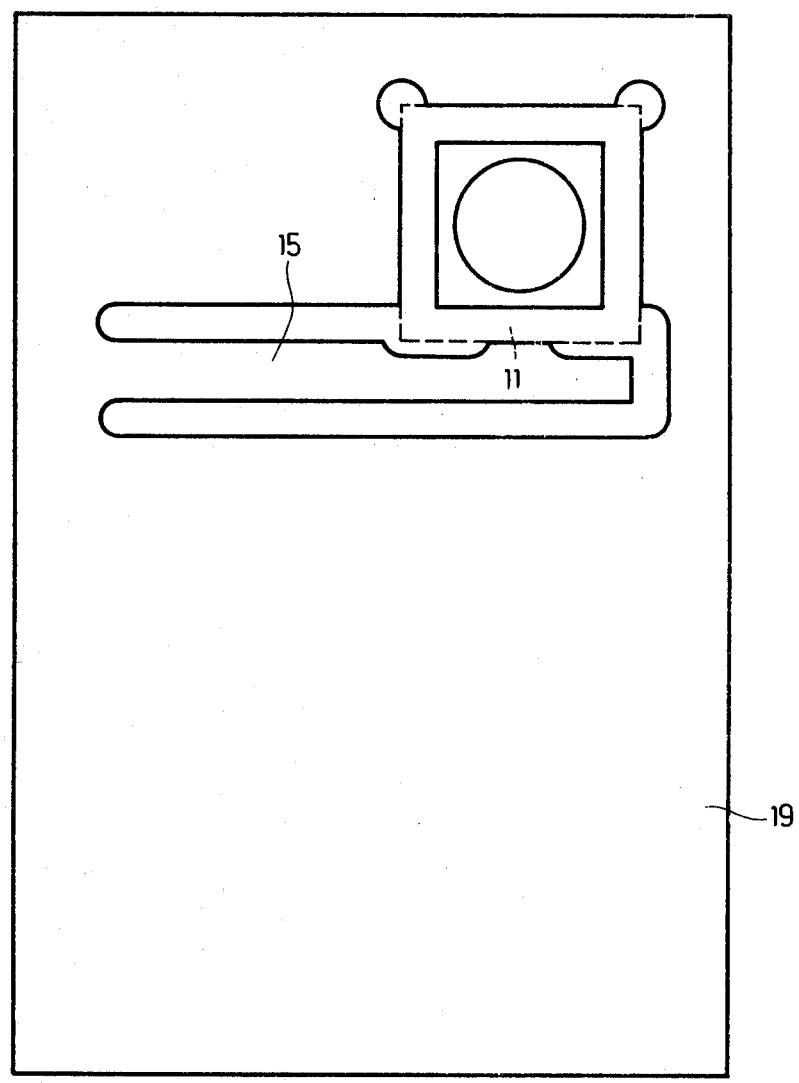
FIGS. 6 and 7 are plan views of two embodiments of holding elements which can be used in the apparatus of FIGS. 1 and 2.
Figure 7:
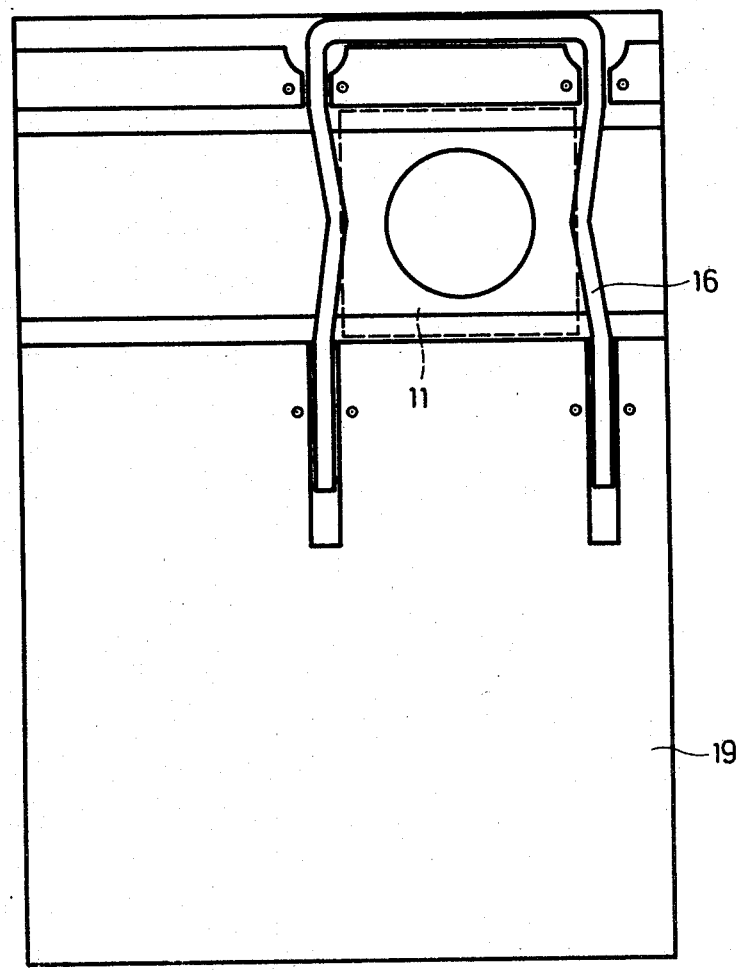

Various glass mounts can be used as carriers for the cubic dosimeter glass 11, typically measuring $8 \times 8 \times 8$ mm$^3$, and two such mounts are shown in FIGS. 6 and 7.

In the two embodiments, the dosimeter glass 11 is pressed by a resilient tongue 15 in FIG. 6, or a resilient stainless steel wire 16 in FIG. 7 in a mount 19, which is shown in FIG. 1, against a face and is thus held by a force lock. Due to the pressure applied, the position of the glass body 11 relative to two outer edges of the mount 19 is accurately defined.

The connection between the glass and the dosimeter mount can be easily released so as to permit replacement of the glass 11 and is stable even at high temperatures, measured values being erased at 400° C.

In the computer 27 the digital signals for positioning of the mirrors 7 and 8 are coded and sent to the digital-/analog-converter 33 via the process control device 31. The linear amplifier 34 amplifies the analog output of the digital/analog-converter 33 in such a way that the current for the movements of one of the mirrors 7 or 8 are proportional to the angle of the mirrors 7 or 8. The process control device 31 is responsible for the selection of one of the mirrors 7 or 8 and for the position of the slit 3. The use of the computer 27 results in a full automatic scanning of the RPL-profile in the x,y,z-axes and in a calculation of the sum of the three RPL-profiles in the x,y,z-axes and of the radiation quality as well as of the direction of the radiation incidence.

It will be understood that the above description of the present invention is susceptible to various modifications, changes and adaptations, and the same are intended to be comprehended within the meaning and range of equivalents of the appended claims.

What is claimed is:

1. In a device for evaluating the state of a phosphate glass dosimeter by effecting differential scanning of the dosimeter glass with light radiation, the improvement comprising: means for holding the glass stationary; means supplying a single beam of light for effecting the evaluation; and scanning means composed of an element defining a pivotal, elongated slit, two rotatable mirrors and two stationary mirrors arranged in the path of the single beam and operable for causing the beam to scan the glass selectively along any one of three coordinates.

2. A device as defined in claim 1 wherein said element defining a slit is located at a point where the path of the beam is stationary, the axes of rotation of said two rotatable mirrors are perpendicular to one another, and said scanning means operate to maintain one of said rotatable mirrors fixed during scanning along any one coordinate.

3. A device as defined in claim 1 or 2 wherein at least one of said rotatable mirrors is selectively positionable for causing said scanning means to deflect the axis of the single beam through a total angle of 270° or 360° between said element defining a slit and the dosimeter glass.

4. A device as defined in claim 1 or 2 further comprising a radiation detector fixedly disposed relative to the glass and is spaced therefrom in a direction perpendicular to the direction of impingement of the single beam on the glass.

5. A device as defined in claim 1 or 2 wherein the coordinates are mutually orthogonal, the glass is in the form of a parallelepiped, and scanning along each coordinate is perpendicular to one surface of the parallelepiped.

6. A device as defined in claim 1 wherein said means for holding the glass stationary comprise a resilient element pressing the glass against a stationary surface, such that the position of two outer edges of the glass is accurately defined.

7. A device as defined in claim 6 wherein the resilient element is a tongue.

8. A device as defined in claim 6 wherein the resilient element is a wire.

9. A device as defined in claim 1 in combination with an adjusting cube surrounding a glass sample and provided with adjusting bores for adjusting said scanning means.

10. A device as defined in claim 1 wherein said element defining a slit is pivotal about an axis parallel to that of the beam and is formed to cause the single beam to have, at the location which it impinges on the glass, a rectangular cross section the narrow dimension of which extends in the scanning direction and is substantially smaller than the dimension of the glass in the scanning direction.

* * * * *